INVENTORS:
BART A. SMITH
JAMES L. LASS
DOMINIC A. VENIER

BY: Samuel E. Turner
ATTORNEY

United States Patent Office 3,689,358
Patented Sept. 5, 1972

3,689,358
NUCLEAR FUEL ASSEMBLY WITH LEAKAGE
FLOW CONTROL MEMBER
Bart A. Smith, James L. Lass, and Dominic A. Venier,
San Jose, Calif., assignors to General Electric Company
Continuation-in-part of application Ser. No. 727,270,
May 7, 1968. This application Aug. 15, 1969, Ser.
No. 850,531
Int. Cl. G21c 3/34
U.S. Cl. 176—78                                   20 Claims

ABSTRACT OF THE DISCLOSURE

A nuclear fuel assembly incorporating a leakage flow control member between the flow channel and the lower tie plate to control the bypass flow of coolant into the spaces between the fuel assemblies of a nuclear reactor.

BACKGROUND

This application is a continuation-in-part of U.S. Pat. application Ser. No. 727,270 filed May 7, 1968, now abandoned.

In a known type of nuclear reactor, for example as used in the Dresden Nuclear Power Station near Chicago, Ill., the reactor core is of the heterogeneous type. That is, the core comprises a plurality of fuel assemblies vertically arranged in an array to form the nuclear reactor core capable of self-sustained nuclear fission reaction. The core is contained in a pressure vessel wherein it is submersed in a working fluid, such as light water, which serves both as a coolant and as a neutron moderator. A plurality of control rods, containing neutron absorbing material, are selectively insertable among the fuel assemblies to control the reactivity of the core.

Each fuel assembly comprises a tubular flow channel containing an array of elongated, cladded fuel elements or rods supported between upper and lower tie plates. The fuel assemblies are supported in the pressure vessel between an upper core grid and a lower core support plate. The lower tie plate of each fuel assembly is formed with a nose piece which fits through an aperture in the core support plate into a pressurized coolant supply chamber. The nose piece is formed with openings through which the pressurized coolant flows upward through the fuel assembly flow channels to remove heat from the fuel elements. A typical fuel assembly of this type is shown, for example, by D. A. Venier et al. in U.S. Pat. No. 3,350,-275. In nuclear reactors of recent design in-core nuclear instrumentation, in the form of neutrol detectors, are contained in instrumentation receptacles located in the gaps between the fuel assemblies In a water reactor heat is transferred from the fuel through the fuel rod cladding to the water flowing upward among the fuel rods. At some elevation the flowing water reaches saturation temperature and beyond this point increasing fractions of the water are in the vapor phase. Normally the heat transfer coefficient between the fuel rod cladding and the water is substantially constant. However, if the heat-flux and consequently the steam fraction is increased sufficiently, a threshold is reached at which the heat transfer coefficient decreases suddenly by a factor of 5 to 10. This is caused by a change in the heat transfer mechanism from nucleate boiling to film boiling and it results in a very rapid, undesirable rise in fuel rod cladding temperature. The heat flux at the threshold between nucleate boiling and film boiling is designated the "critical heat flux."

An important consideration in the design of boiling water reactors is the relationship between the in-channel flow or the coolant flow through the fuel assembly flow channels and the bypass flow or the coolant flow through the gaps among the fuel assemblies. On the one hand it is desirable to maximize the in-channel flow to thereby maximize the margin to critical heat flux. On the other hand it is necessary to provide a limited amount of bypass flow to avoid coolant stagnation and steam voids and to adequately cool the control rods and the in-core instrumentation devices located in the gaps between the fuel assembly flow channels. Thus for a given total core recirculation flow, the desired balance between in-channel and bypass flow maintains an adequate margin to critical heat flux while avoiding excessive out-of-channel voids.

In prior arrangements control of bypass flow is accomplished by allowing an amount of coolant leakage between the assembly flow channel and the lower tie plate. The flow channel is not fixed to the fuel assembly but is instead a slip fit over the upper and lower tie plate so that it readily can be removed during refueling and for inspection of the fuel rods and fuel assemblies. The flow channel is formed of relatively thin material to conserve space and to minimize parasitic neutron absorption and it is found that increases in pressure of the coolant (to increase coolant flow through the fuel assemblies) causes the flow channel to deflect away from the lower tie plate thus causing an excessive amount of bypass flow with the danger of depriving the fuel assembly of its required coolant flow.

The prior arrangements for bypass flow have been found inadequate for nuclear reactors of recent design which operate at higher power density, higher steam qualities and lower thermal margins. Thus it is found desirable to provide more stringent and accurate control of the bypass flow.

SUMMARY

It is an object of the invention to provide an improved fuel assembly incorporating a bypass flow control arrangement which maintains the bypass flow at a substantially constant percentage of total core flow and which does not unduly compromise the ease of removing and replacing the flow channel.

These and other objects of the invention are accomplished by providing a leakage flow control member between the flow channel and the lower tie plate which maintains a relatively constant bypass flow area.

In accordance with a first illustrated embodiment, the leakage control member is in the form of a spring member retained against the lower tie plate and bearing against the flow channel. The spring member is thus adapted to follow the deflections of the flow channel due to changes in pressure. The spring member may be slotted to provide bypass flow passages. Alternatively or additionally separate bypass flow passages may be provided through the lower tie plate.

In accordance with a second illustrated embodiment, the leakage flow control member is in the form of a resilient split ring retained in a circumferential groove in the lower tie plate and adapted to bear against an inside surface of the flow channel.

In accordance with a third illustrated embodiment, the leakage flow control member is in the form of a resilient bellows secured at one end to the lower tie plate and adapted to engage the lower edge of the flow channel at its other end.

In accordance with a fourth illustrated embodiment of the invention, the leakage flow control member is in the form of a radially extending flange formed on or secured to the lower tie plate between the lower tie plate and the flow channel. The circumference of the flange is selected to provide an interference fit with the flow channel sufficient to preload or prestress the flow channel to the expected maximum deflection caused by the maximum design differential pressure.

BRIEF DESCRIPTION OF THE DRAWING

The invention is described more specifically hereinafter with reference to the accompanying drawing wherein:

FIG. 3b is a perspective view of a segment of the leakage control spring of FIG. 3a;

GENERAL DESCRIPTION

Figure 1:
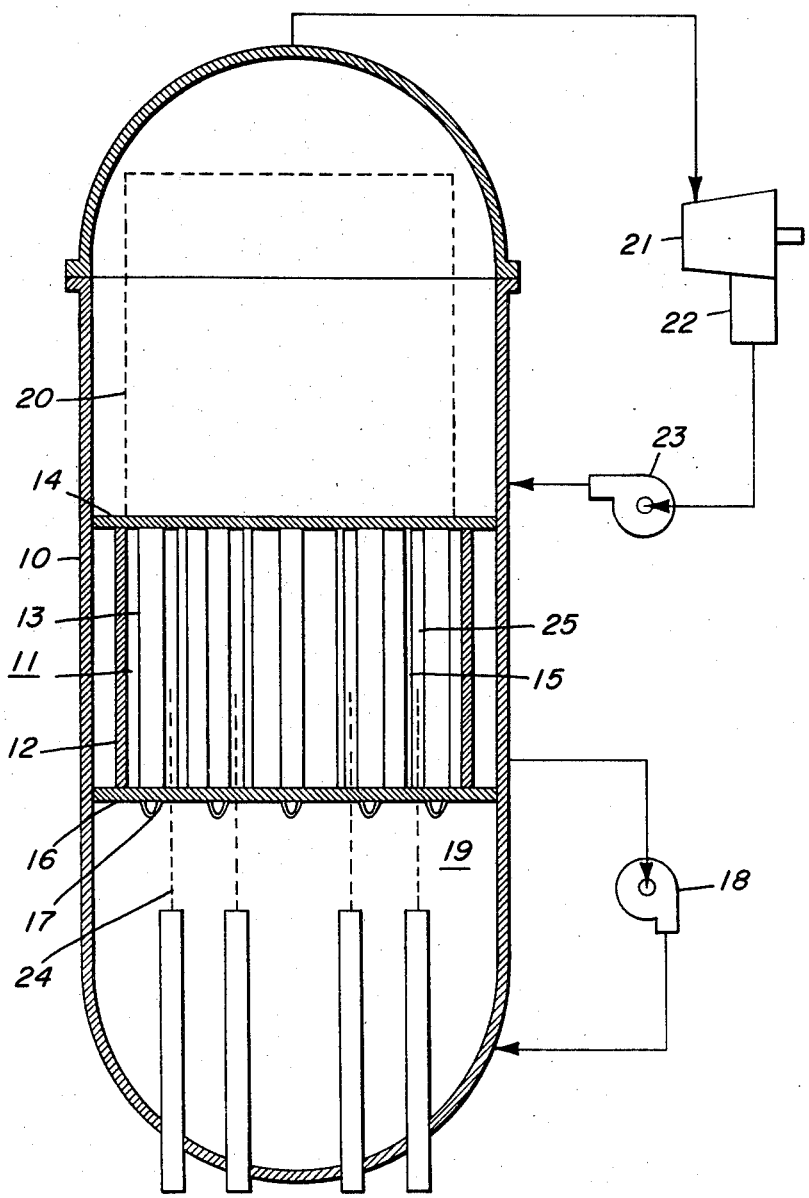
FIG. 1 is a schematic illustration of a water reactor steam generator.

The invention is described herein in connection with a water cooled and moderated nuclear reactor, an example of which is illustrated in FIG. 1. Such a reactor system includes a pressure vessel 10 containing a nuclear chain reactor core 11 submersed in a coolant such as light water. The core 11 is surrounded by an annular shroud 12. The core 11 includes a plurality of replaceable fuel assemblies 13 arranged in spaced relation and supported in the vessel 10 between an upper core grid 14 and a lower core support plate 16. Each fuel assembly includes a nose piece 17 which engages a support socket in the support plate 16. The end of the nose piece projects through the support plate 16 and is formed with openings for communication with a coolant supply chamber 19. A circulation pump 18 pressurizes the coolant in the supply chamber 19 from which the coolant is forced through the openings in the nose pieces 17 upward through the fuel assemblies. A part of the coolant is thereby converted to steam which passes through a separator-dryer arrangement 20 to a utilization device such as a turbine 21. Condensate formed in a condenser 22 is returned as feedwater to the vessel 10 by a pump 23. A plurality of control rods 24 are selectively insertable among the fuel assemblies 13 for control of the reactivity of the core. A plurality of instrumentation receptacles 15 are positioned among the fuel assemblies to contain neutron detectors for monitoring the power level of the core.

Figure 2:
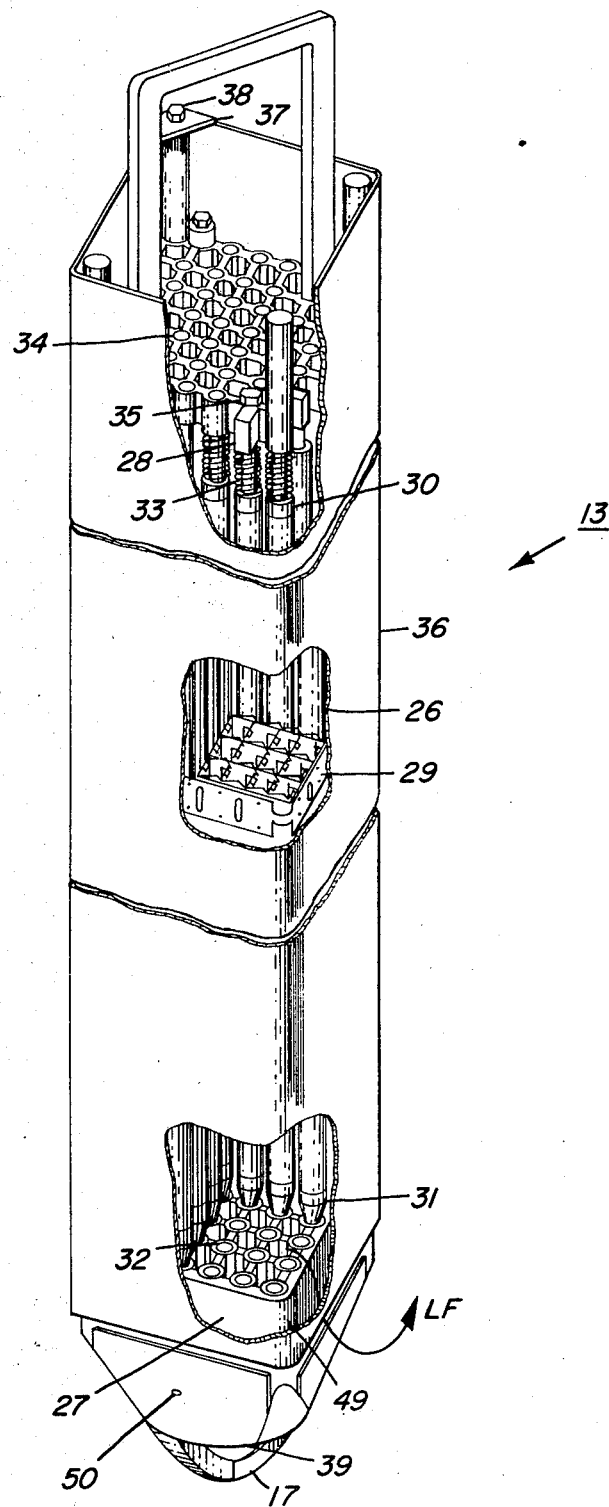
FIG. 2 is a partly cutaway perspective view of a fuel assembly.

Illustrated in FIG. 2 is a fuel assembly 13 comprising a plurality of elongated fuel rods 26 supported between a lower tie plate 27 and a skeletonized upper tie plate 28. The fuel rods 26 pass through a plurality of fuel rod spacers 29 which provide intermediate support to retain the elongated rods in spaced relation and restrain them from lateral vibration.

Each of the fuel rods 26 comprises an elongated tube containing the fissile fuel, in the form of pellets, particles, powder or the like, sealed in the tube by upper and lower end plugs 30 and 31. Lower end plugs 31 are formed with a taper for registration and support in support cavities 32 which are formed in the lower tie plate 27. Upper end plugs 30 are formed with extensions 33 which register with support cavities 34 in the upper tie plate 28.

Several of the support cavities 32 (for example, selected ones of the edge or peripheral cavities) in the lower tie plate 27 are formed with threads to receive fuel rods having threaded lower end plugs 31. The extensions 33 of the upper end plugs 30 of these same fuel rods are elongated to pass through the cavities in upper tie plate 28 and are formed with threads to receive internally threaded retaining nuts 35. In this manner the upper and lower tie plates and the fuel rods are formed into a unitary structure.

The fuel assembly 13 further includes a thin-walled tubular flow channel 36, of substantially square cross section, adapted to provide a sliding fit over the lower and upper tie plates 27 and 28 and the spacers 29 so that it readily may be mounted and removed. The channel 36 has a tab 37 welded to the top end which provides for fastening the channel to the fuel bundle with a bolt 38.

The lower tie plate 27 is formed with a nose piece 17 adapted, as mentioned hereinbefore, to support the fuel assembly in a socket in the support plate 16 (FIG. 1). The end of the nose piece is formed with openings 39 to receive the pressurized coolant so that it flows upward among the fuel rods.

To avoid stagnation of the coolant in the spaces 25 (FIG. 1) among the fuel assemblies, a portion (in the order of 5–6 percent) of the coolant flow into each fuel assembly is allowed to leak into the adjacent spaces 25 from between the lower tie plate 27 and the channel 36 of the fuel assembly as indicated by the arrow legended LF in FIG. 2 or through special bypass flow passages 50 in the lower tie plate 27 or bypass flow passages 51 through the lower portion of the flow channel 36. As discussed hereinbefore, the prior arrangements have not provided adequate regulation of this leakage flow and in accordance with the present invention a leakage flow control member is positioned between the channel 36 and the lower tie plate 27.

First embodiment

Figure 3B:
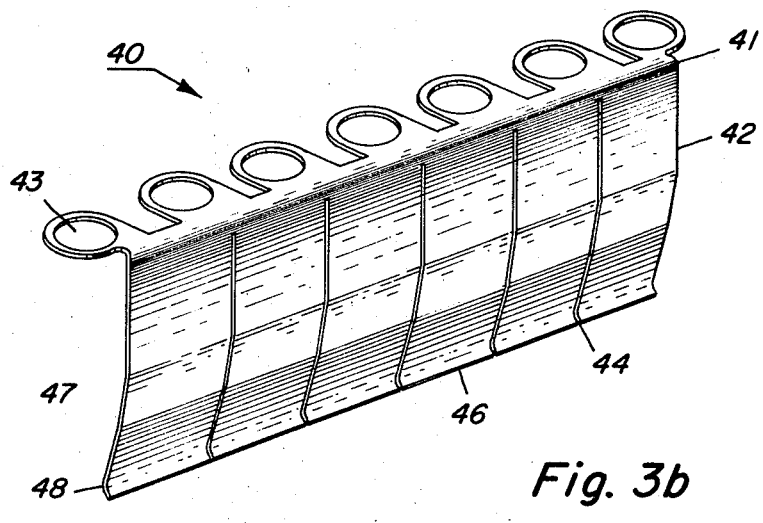
Figure 3A:
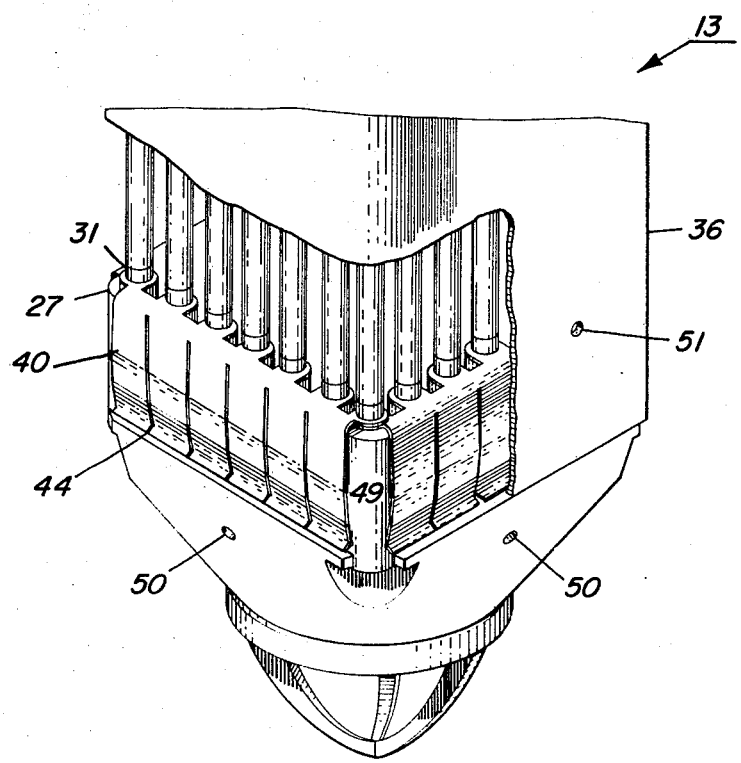
FIG. 3a is an enlarged view of the lower portion of the fuel assembly illustrating the leakage control spring of the first embodiment.

A first embodiment of the invention is illustrated in an enlarged view of the lower portion of the fuel assembly 13 in FIG. 3a. In this embodiment of the invention the leakage control member is in the form of a spring member 40 positioned between the peripheral surface of the lower tie plate 27 and the lower internal surface of the channel 36. The spring member 40 conveniently may be formed of four segments, one segment of which is separately illustrated in FIG. 3b. The member 40 may be formed of a suitable material such as Inconel-X.

Each spring member segment comprises a base portion 41 and a bearing portion 42. The base portion is formed with a series of apertures 43 appropriately sized and spaced to receive the lower end plugs 31 of the peripheral row of fuel rods and to engage the tapered portion of the lower end plugs 31 whereby the base portion of the spring member segment is retained in position between the lower end plugs of these fuel rods and the lower tie plate 27. The bearing portion 42 of the spring member segment is formed with an outwardly extending relatively flat portion 47 adapted to bear against the flow channel 36 and with an inwardly extending bend 48 adapted to bear against the lower tie plate 27. In the mounted position of the spring member the flat portion 47 is thus biased outwardly against the lower internal surface of the flow channel 36. Thus when the lower portion of the flow channel 36 expands, for example, because of increased coolant pressure, the flat portion 47 maintains its seal against the internal surface of the flow channel. It was not found necessary to extend the spring member 40 around corners 49 of the lower tie plate 27 since the channel 36 tends to fit tightly against these corners. For example, in response to increased coolant pressure, the channel 36 tries to assume a more circular cross section thus actually increasing the bearing pressure of the channel 36 against the corners 49.

As illustrated in FIGS. 3a and 3b, the bearing portion 42 of the spring member segments 40 may be formed with open-ended flow control slots 44 to provide a predetermined bypass flow passage area. Alternatively or additionally the lower tie plate 27 may be formed with bypass flow passages 50 and/or bypass flow passages 51 may be formed through the walls of the lower portion of the flow channel 36 to provide the desired bypass flow of the coolant among the fuel assemblies.

Second embodiment

Figure 4:
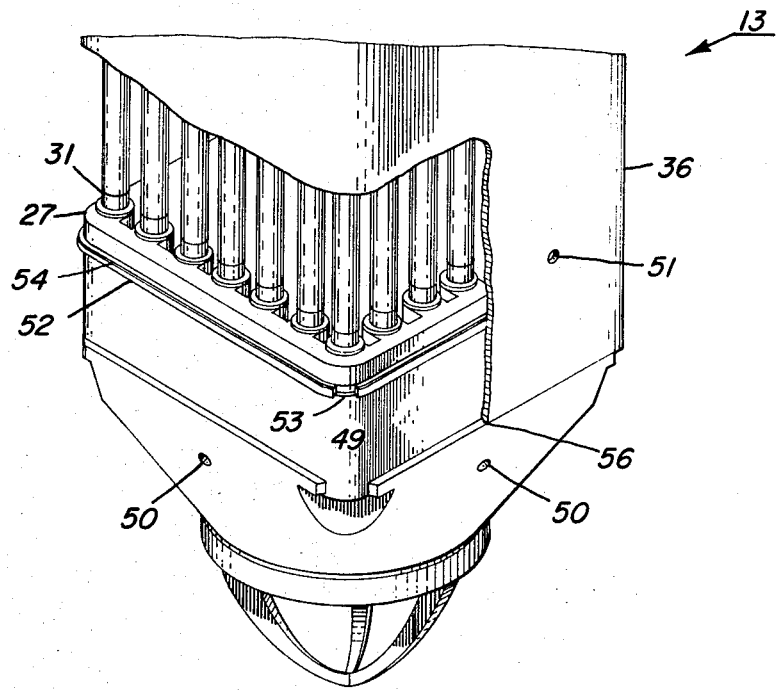
FIG. 4 is an enlarged view of the lower portion of the fuel assembly illustrating the split ring leakage control member of the second embodiment.

A second embodiment of the invention is illustrated in an enlarged view of the lower portion of the fuel assembly 13 in FIG. 4. In this embodiment the flow control member is formed of a resilient split ring 52 retained in a circumferential groove 53 in the lower tie plate 27. The ring 52 is formed and sized to provide an outward bias against the lower inner surface of the flow channel 36 sufficient to compensate for the maximum anticipated expansion of the flow channel. The groove 53 is formed with sufficient depth and the ring 52 is formed with sufficient thickness to assure retention of ring 52 in the groove 53 under maximum expansion conditions. The ring 52 is formed with a chamfered upper edge 54 and the inner bottom edge 56 of the flow channel 36 is also chamfered to allow ready mounting of the flow channel over the split ring.

Third embodiment

Figure 5:
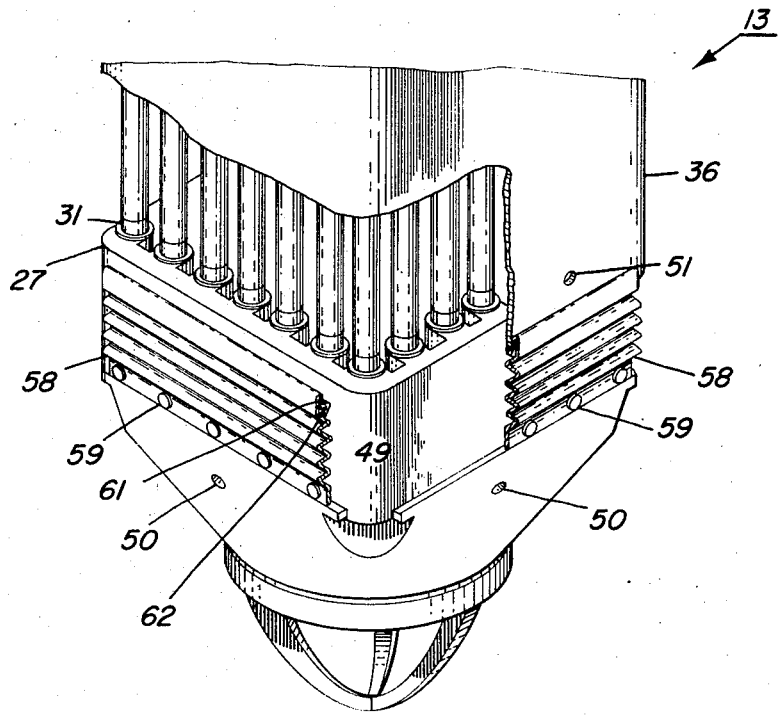
FIG. 5 is an enlarged view of the lower portion of the fuel assembly illustrating the resilient bellows leakage control member of the third embodiment.

A third embodiment of the invention is illustrated in FIG. 5 in an enlarged view of the lower portion of the fuel assembly 13. In this embodiment the flow control member is formed of a resilient bellows 58 secured at its lower end, by rivets 59 or other means, to the lower tie plate 27 and extending upward to engage at its upper end the lower edge of the flow channel 36. The upper end of the bellows 58 is formed with an upstanding portion 61 and a lateral portion 62 to receive the lower edge of the flow channel. It is found unnecessary to extend the bellows around the corners 49 of the lower tie plate 27 since the flow channel 36 bears tightly against these corners and since an increase in pressure within the channel tends to circularize the channel with resultant even tighter fit against the corners 49. Thus the bellows 58 may be segmented, a respective segment being secured to each of the flat sides of lower tie plate 27, as illustrated in FIG. 5.

Fourth embodiment

Figure 6:
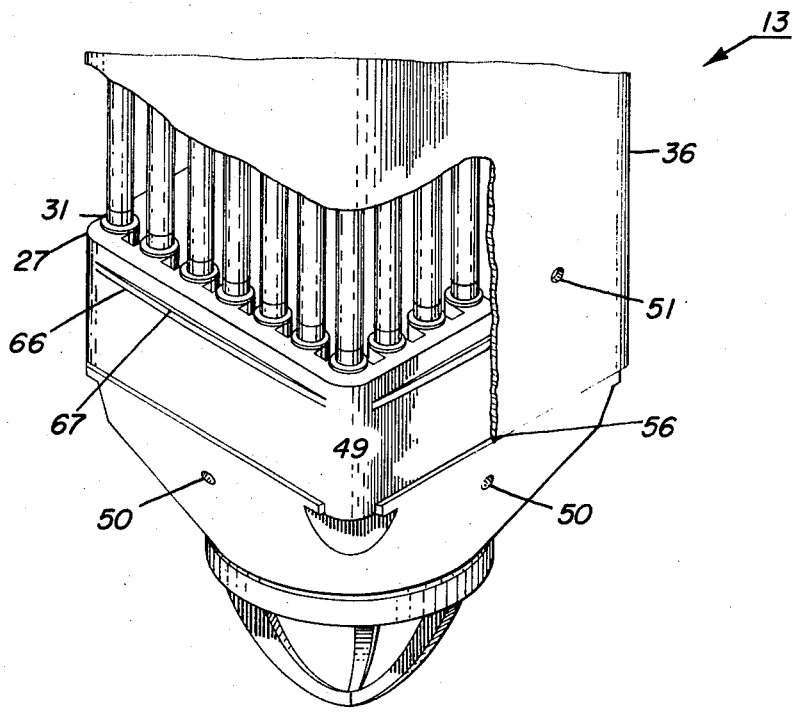
FIG. 6 is an enlarged view of the lower portion of the fuel assembly illustrating the preload flange leakage control member of the fourth embodiment.

A fourth embodiment of the invention is illustrated in FIG. 6 in an enlarged view of the lower portion of the fuel assembly 13. In this embodiment the flow control member is in the form of a laterally extending flange 66 formed on or secured to the lower tie plate 27 to engage the lower end of the flow channel 36. The lateral thickness and hence the circumference of the flange 66 is selected to provide an interference fit with the flow channel 36 sufficient to preload or prestress the flow channel to the expected maximum deflection caused by the maximum design differential pressure to be experienced by the flow channel. In this manner contact between the inner surface of the flow channel and the flange 66 is maintained for all normal operating pressures. It is found unnecessary to extend the flange 66 around the corners of the lower tie plate. The flange 66 is therefore segmented, a respective segment being formed along each of the flat sides of the lower tie plate 27. Each segment of flange 66 is preferably tapered or rounded and the ends thereof are blended into the corners 49 so that the circumference of the flange 66 conforms more nearly to the natural expanded shape of the flow channel 36. The upper edge 67 of the flange 66 is tapered and the inner lower edge 56 of the flow channel 36 is chamfered to facilitate mounting of the flow channel.

Figure 7:
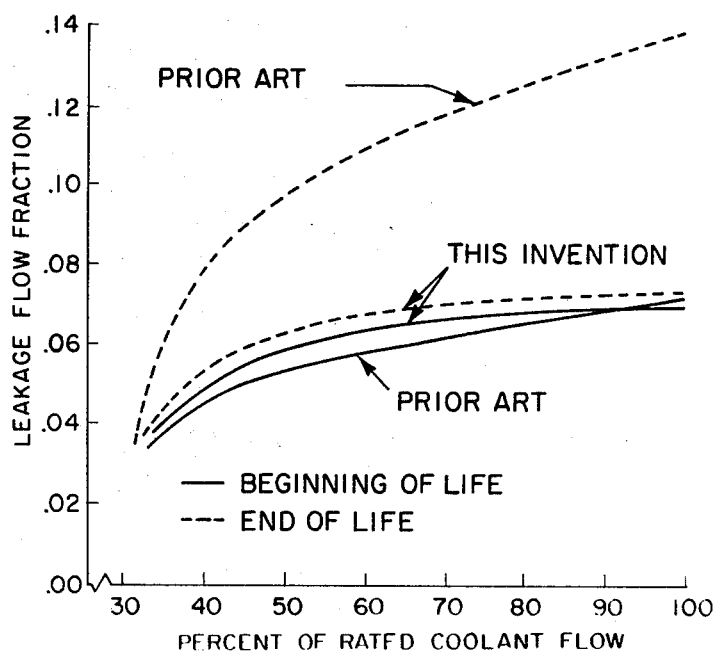
FIG. 7 is a graphical illustration of the performance of the present invention compared to the performance of the prior art arrangement.

The effectiveness of the present invention is graphically illustrated in FIG. 7 which compares the performance of the flow control arrangement of the invention with the prior art arrangement which relied only upon a predetermined fit between the flow channel 36 and the lower tie plate 27. The solid curves show the performance of new fuel assemblies while the dashed curves show end-of-life performance, that is, after the assembly has been operated in a reactor core on the order of several years. For the prior art arrangement the leakage flow increases by more than one-third with life while for the arrangement of the present invention the leakage flow change with life is less than one percent. Changes in percentage of leakage flow with changes in coolant flow are significantly less for the arrangement of the present invention. A further outstanding advantage of the invention is that it does not compromise or complicate the ready removal and replacement of the flow channel 36.

While illustrative embodiments of the invention have been described herein, modifications and adaptations thereof may be made by those skilled in the art without departture from the spirit and scope of the invention as defined by the following claims.

What is claimed is:

1. A fuel assembly comprising a plurality of fuel rods positioned in a spaced array by upper and lower tie plates, said lower tie plate having means to receive therethrough a flow of coolant, an open-ended tubular flow channel surrounding said array for conducting said coolant upward past said fuel rods, said channel being attached to said assembly solely at the top of said assembly with readily releasable attachment means and said channel being freed from and detached from lower tie plate so that said channel readily is removable from said assembly, means separate from said channel connecting said upper and lower tie plates together and maintaining said fuel rods in said spaced array of said flow channel, and a leakage control member positioned between said lower tie plate and said flow channel for limiting the leakage of said coolant between said lower tie plate and said flow channel.

2. The fuel assembly of claim 1 wherein said lower tie plate is formed with a bypass coolant flow passage directly from the interior of said lower tie plate to the exterior of said fuel assembly.

3. The fuel assembly of claim 1 wherein said assembly is of about square cross section and wherein said leakage control member is segmented, a respective segment being positioned along each side of said lower tie plate.

4. The fuel assembly of claim 1 wherein said leakage control member comprises a flange secured to said lower tie plate, said flange contacting the inner surface of said flow channel and circumferentially preloading the adjacent portion of said flow channel.

5. The fuel assembly or claim 2 wherein the edge of said flange in the direction of said channel is formed with a taper and wherein an inner edge of an end of said channel is chamfered for engagement with the tapered edge of said flange.

6. The fuel assembly of claim 5 wherein said assembly is of about square cross section and wherein said flange is segmented, a respective segment of said flange being formed along each side of said lower tie plate, each of said segments being tapered with the ends thereof blending into the corners of said lower tie plate.

7. The fuel assembly of claim 1 wherein said leakage control member comprises a resilient member positioned between said lower tie plate and said flow channel.

8. The fuel assembly of claim 7 wherein said resilient member is captured in a circumferential groove in said lower tie plate.

9. The fuel assembly of claim 8 wherein said resilient member comprises a split ring captured in said groove.

10. The fuel assembly of claim 9 wherein the edge of said split ring in the direction of said channel is chamfered, and wherein an inner edge of an end of said channel is chamfered for engagement with said ring.

11. The fuel assembly of claim 7 wherein said resilient member comprises a spring member.

12. The fuel assembly of claim 11 wherein said spring member includes a base portion captured and retained between a plurality of said fuel rods and said lower tie plate.

13. The fuel assembly of claim 11 wherein said spring member is formed with openings to provide a leakage flow area.

14. The fuel assembly of claim 13 wherein said openings are slots in said spring member.

15. The fuel assembly of claim 14 wherein said slots are open-ended to thereby constitute said spring member a plurality of resilient fingers.

16. The fuel assembly of claim 15 wherein each of said resilent fingers is formed with an outwardly extending portion for bearing against said flow channel.

17. The fuel assembly of claim 16 wherein each of said resilient fingers is formed with an inwardly extending portion for bearing against said one of said tie plates.

18. The fuel assembly of claim 7 wherein said resilient member comprises a resilient bellows secured at one end to said lower tie plate and at its other end engaging the adjacent end of said flow channel.

19. The fuel assembly of claim 18 wherein said other end of said bellows is formed with an upstanding portion adjacent the outside of said flow channel and with a lateral portion for engaging said adjacent end of said flow channel.

20. The fuel assembly of claim 18 wherein said bellows is circumferentially segmented.

References Cited

UNITED STATES PATENTS

| | | | |
|---|---|---|---|
| 3,104,218 | 9/1963 | Speidel et al. | 176—78 |
| 3,137,635 | 6/1964 | Moore et al. | 176—78 X |
| 3,255,091 | 6/1966 | Frisch | 176—78 |
| 3,309,280 | 3/1967 | Balog | 176—78 X |
| 3,317,399 | 5/1967 | Winders | 176—78 |
| 3,350,275 | 10/1967 | Venier et al. | 176—76 X |

FOREIGN PATENTS

| | | | |
|---|---|---|---|
| 1,030,466 | 5/1966 | Great Britain | 176—78 X |
| 1,381,787 | 11/1964 | France | 176—78 |
| 1,175,803 | 8/1964 | Germany | 176—43 |
| 969,131 | 9/1964 | Great Britain | 176—78 |

CARL D. QUARFORTH, Primary Examiner

G. G. SOLYST, Assistant Examiner

U.S. Cl. X.R.

176—76